Sept. 11, 1956  J. MODIN  2,762,048
WELDING HELMETS
Filed Oct. 1, 1954
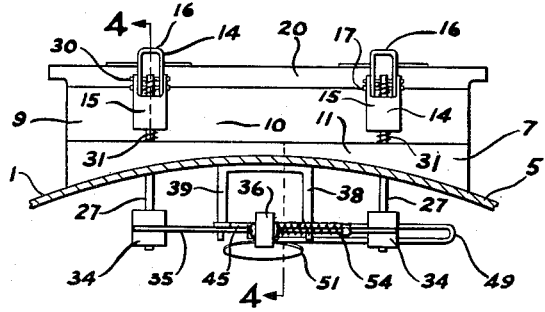
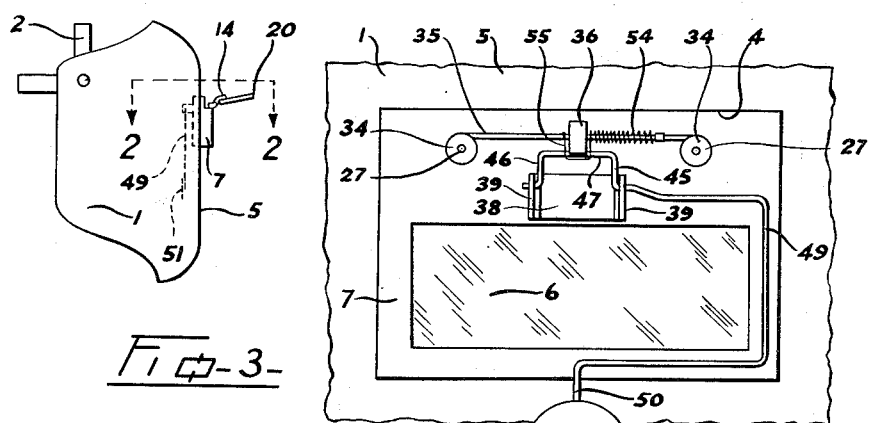
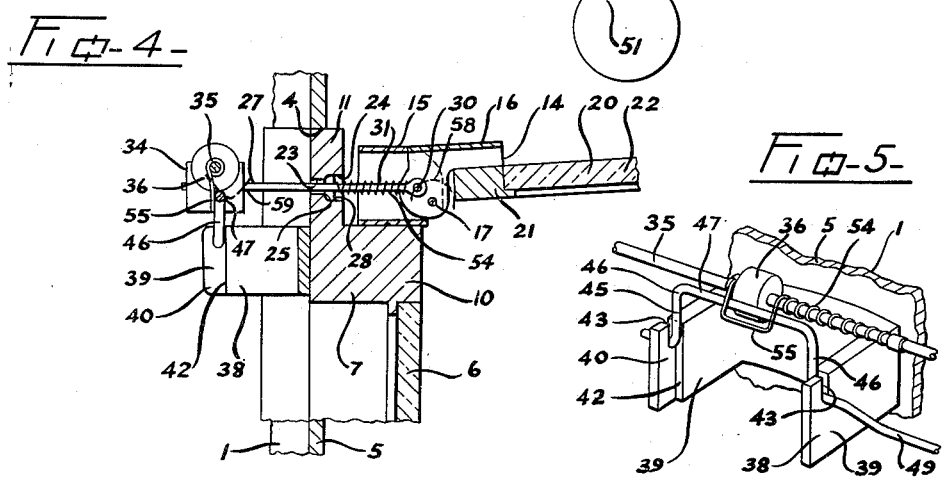
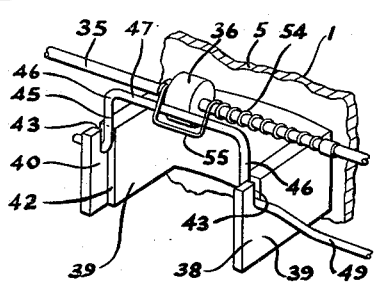
INVENTOR
JOHN MODIN
ATTORNEY 2,762,048
Patented Sept. 11, 1956

2,762,048
WELDING HELMETS

John Modin, Vancouver, British Columbia, Canada

Application October 1, 1954, Serial No. 459,803

6 Claims. (Cl. 2—8)

My invention relates to improvements in welding helmets.

The objects of the invention are to provide in a welding helmet having a window of plain glass which is adapted to be covered when required by a visor of colored glass means whereby the visor may be retained in raised or inoperative position, and to provide means whereby said visor may be released to swing to the closed or operative position by the simple action of the wearer blowing upon a trigger member disposed in close proximity to his mouth.

Further objects of the invention will appear as the specification proceeds.

Referring to the accompanying drawings:

Figure 1 is a side elevational view of the invention.

Figure 2 is an enlarged sectional plan view taken on the line 2—2 of Figure 1.

Figure 3 is an elevational view of the inner face of the device.

Figure 4 is a detail sectional view taken on the line 4—4 of Figure 2.

Figure 5 is a perspective detail view showing the preferred method of journaling the crank in its supporting bracket.

In the drawings like characters of reference indicate corresponding parts in each figure.

The numeral 1 indicates a welding helmet which is adapted to be supported over the face of the wearer by means of straps or bands 2. A rectangular opening 4 is provided in the front wall 5 of the helmet and fitted to said opening is a window 6 which is enclosed in a frame 7. The window is of plain glass of substantial thickness, such as would protect the wearer's eyes from flying fragments encountered when chipping, etc. The enclosing frame of the window projects some little distance beyond the front wall 5 of the helmet and is rebated on its upper edge as at 9 to define a horizontal wall 10 and a vertical wall 11. Mounted upon the horizontal wall are transversely spaced hinges 14 each having an inner and an outer member 15 and 16 respectively, which members are inverted U-shaped in cross section and are connected by a hinge pin 17. Secured to the members 16 of the hinges is a visor 20 formed by a frame 21 fitted with a panel 22 of colored glass which is of suitable density to protect the wearer's eyes from the glare of the welding flame. A horizontal passage 23 is drilled in the vertical wall 11 of the frame in alignment with each of the hinges and said passage is counterbored to provide a recess 24 having a semispherical base 25. A link 27 slidably extends through each of the passages and is fitted with a semispherical washer 28 which is housed in the base of the recess, so that said link may have a slight rocking movement within the passage. The outer end of the links are secured to an adjacent member 16 by a pin 30 which is disposed above the hinge pin 17 and, when the visor is raised, slightly to the rear thereof, see Figure 4.

A spring 31 surrounds each link between the washer and the pin and is adapted to be in compression when the visor is in raised position. The inner ends of the links are fitted with knobs 34 between which a cross shaft 35 extends and journalled upon said shaft is a centrally disposed circular cam in the form of a freely rotatable roller 36. Extending inwardly from the inner face of the frame 7 is a U-shaped bracket 38 having side members 39 which are provided with a rebate 40 upon their inner edges. The rebates provide a stop 42 upon the inner faces of the side members and adjacent said stops vertical slots 43 are formed. Rockingly mounted in the slots is a crank 45 having vertical side portions 46 and a connecting horizontal portion or crank pin 47 which is adapted to be engaged by the roller 33. Extending from one end of the crank shaft is a lever 49 which is bent around one end of the window 6 and has a free end 50 which is disposed in the plane of the roller. A disk or trigger 51 is fitted to the end 50 and is disposed in a position opposite to the mouth of the helmet wearer. The cross shaft 35 is nonrotatably fitted with a torsional spring 54 having a U-shaped member 55 which straddles the cam roller and bears against the crank pin 47. The spring 54 serves to retain the roller against endwise movement upon the cross shaft and to rock the crank pin in a clockwise direction as viewed in Figure 4.

When in the position shown in Figure 4, the roller 36 and the cross shaft are held against any downward movement, consequently the knobs cannot move downwardly and the outer end of the links 27 cannot rise, so that the spring 31 cannot move said links over their arc of travel to close the visor 20 into contact with the window 6. In Figure 4 the arc of travel of the outer end of each of the links 27, or the centre of the pin 30, is shown in dotted line at 58 and the arc of travel of the centre of the complementary knob 34 is shown in dotted line at 59. When the user blows upon the trigger 51 it rocks the crank shaft so that the crank pin in moving rearwardly or to the left in Figure 4 will first lift the cross shaft and the knobs 34, as said pin raises the roller then the knobs will be free to swing through their arc of travel 59 as the outer ends of the links 27 swing in substantially opposite curve over the arc of travel 58 of the pins 30, thus allowing the compressed springs 31 to overcome the torque of the spring 54 and close the visor 20 upon the window 6. The torsion spring 54 also serves to hold the trigger away from the inner face of the welding helmet until it is moved by manual means irrespective of the position of the helmet when in use.

When the visor is again raised to a substantial horizontal position the links 27 are thrust inwardly, so that the roller is caused to ride over the crank pin 47. The over-riding action of the roller 36 augmented by the torque of the spring 54 swings the crank in a clockwise direction until the side portions 46 abut the stops 42, whereupon the crank pin 47 becomes lodged beneath said roller at a point slightly to the right of the axis of the cross shaft 35, see Figure 4, and the visor is held in raised position.

What I claim is:

1. A welding helmet comprising a face enclosing shield having a frame enclosed window opening, a visor hingedly mounted upon an upper part of the frame, a link extending through said frame, said link being connected at one end to the visor and having a cam member carried at its opposite end, a spring extending lengthwise of said link, one end of said spring being anchored to the frame and the other end being attached to said link to urge the visor to closed position upon the frame, a manually operated trigger mechanism within the shield, said trigger mechanism having a crank pin normally engaging the cam member and adapted to exert a lifting strain on the cam and a resistance to endwise movement of the link when the trigger mechanism is set to close the visor and to remove the resistance to endwise movement of the link when the trigger mechanism is manually operated.

2. A welding helmet comprising a face enclosing shield having a frame enclosed window opening, a visor hingedly mounted upon an upper part of the frame, a link extending through said frame, said link being connected at one end to the visor and having a cam member carried at its opposite end, a spring extending lengthwise of said link, one end of said spring being anchored to the frame and the other end being attached to said link to urge the visor to closed position upon the frame, a manually operated trigger mechanism within the shield, said trigger mechanism having a crank pin normally engaging the cam member and adapted to exert a lifting strain on the cam and a resistance to endwise movement of the link when the trigger mechanism is set to close the visor and to remove the resistance to endwise movement of the link when the trigger mechanism is manually operated and resilient means associated with the cam member adapted to hold the crank pin in engagement with said cam member subsequent to the manual actuation of the trigger mechanism.

3. A welding helmet comprising a face enclosing shield having a frame enclosed window opening, a visor hingedly mounted upon an upper part of the frame, a link extending through said frame and having endwise slidable and oscillatory movement therein, said link having connection with the visor at one end and having a cam member at its opposite end, a spring extending lengthwise of the link, said spring being connected adjacent an end of the link and to the frame to urge the visor to close upon the opening, and a trigger mechanism within the shield adapted to engage the cam and cause said cam to assist the spring to move the link to close the visor, said trigger mechanism being adapted to engage the cam and retain the link in a normal position of rest whereby the visor is open.

4. A welding helmet as claimed in claim 3 being characterized in that the cam member is a roller and the trigger mechanism is provided with a crank pin to engage the roller, and movement of the roller relative to that of the crank pin in one direction imparts a movement in an opposite direction to the other end of the link.

5. A welding helmet comprising a face enclosing shield having a frame enclosed window, a visor having a pair of spaced hinges mounting said visor upon an upper part of the frame, said frame having spaced passages extending therethrough in a direction normal to the plane of the shield, a link slidably mounted in each of said passages, the outer end of each link being connected to a visor hinge and having an arc of travel above the horizontal axis of the link, a cross shaft connecting the inner ends of the links, a cam roller journalled intermediate the length of the cross shaft having an arc of travel below the horizontal axis of the links, a spring extending lengthwise of each link and adapted to urge the visor to closed position upon the frame, a crank rockingly mounted upon the inner face of the frame and having a crank pin adapted to be partly overridden by the cam roller when the visor is manually raised to open position, a lever extending downwardly from the crank, a trigger carried upon the lower end of the lever, said crank being adapted to be rocked in response to pressure upon the trigger to force the crank pin from below the cam roller and enable the springs to close the visor upon the window opening.

6. A welding helmet comprising a face enclosing shield having a frame enclosed window, a visor having a pair of spaced hinges mounting said visor upon an upper part of the frame, said frame having spaced passages extending therethrough in a direction normal to the plane of the shield, a link slidably mounted in each of said passages, the outer end of each link being connected to a visor hinge and having an arc of travel above the horizontal axis of the link, a cross shaft connecting the inner ends of the links, a cam roller journalled intermediate the length of the cross shaft having an arc of travel below the horizontal axis of the links, a spring extending lengthwise of each link and adapted to urge the visor to closed position upon the frame, a crank rockingly mounted upon the inner face of the frame and having a crank pin adapted to be partly overridden by the cam roller when the visor is manually raised to open position, a lever extending downwardly from the crank, a trigger carried upon the lower end of the lever, said crank being adapted to be rocked in response to pressure upon the trigger to force the crank pin from below the cam roller and enable the springs to close the visor upon the window opening, and a spring carried by the cross shaft and engaging the crank to normally retain the crank pin in engagement with the cam roller.

References Cited in the file of this patent

UNITED STATES PATENTS

| | | |
|---|---|---|
| 1,777,454 | Shirmer | Oct. 7, 1930 |
| 2,190,074 | Locher | Feb. 13, 1940 |